United States Patent
Lesso

(10) Patent No.: US 11,705,135 B2
(45) Date of Patent: *Jul. 18, 2023

(54) DETECTION OF LIVENESS

(71) Applicant: Cirrus Logic International Semiconductor Ltd., Edinburgh (GB)

(72) Inventor: John Paul Lesso, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/060,339

(22) Filed: Oct. 1, 2020

(65) Prior Publication Data

US 2021/0027791 A1 Jan. 28, 2021

Related U.S. Application Data

(63) Continuation of application No. 16/156,623, filed on Oct. 10, 2018, now Pat. No. 10,847,165.

(30) Foreign Application Priority Data

Feb. 1, 2018 (GB) ...................................... 1801664

(51) Int. Cl.
*G10L 17/26* (2013.01)
*G10L 17/00* (2013.01)
(Continued)

(52) U.S. Cl.
CPC .......... *G10L 17/26* (2013.01); *G01S 7/52004* (2013.01); *G01S 7/539* (2013.01);
(Continued)

(58) Field of Classification Search
CPC ......... G10L 17/00; G10L 17/26; G01S 15/88; G01S 5/18
See application file for complete search history.

(56) References Cited

U.S. PATENT DOCUMENTS 5,197,113 A 3/1993 Mumolo
5,568,559 A 10/1996 Makino
(Continued)

FOREIGN PATENT DOCUMENTS

AU 2015202397 B2 5/2015
CN 1497970 A 5/2004
(Continued)

OTHER PUBLICATIONS

Ohtsuka, Takahiro and Kasuya, Hideki, Robust ARX Speech Analysis Method Taking Voice Source Pulse Train Into Account, Journal of the Acoustical Society of Japan, 58, 7, pp. 386-397, 2002.
(Continued)

*Primary Examiner* — Paras D Shah
(74) *Attorney, Agent, or Firm* — Jackson Walker L.L.P.

(57) ABSTRACT

Detecting a replay attack on a voice biometrics system comprises: receiving a speech signal from a voice source; generating and transmitting an ultrasound signal through a transducer of the device; detecting a reflection of the transmitted ultrasound signal; detecting Doppler shifts in the reflection of the generated ultrasound signal; and identifying whether the received speech signal is indicative of liveness of a speaker based on the detected Doppler shifts. The method further comprises: obtaining information about a position of the device; and adapting the generating and transmitting of the ultrasound signal based on the information about the position of the device.

13 Claims, 11 Drawing Sheets

Related U.S. Application Data

(60) Provisional application No. 62/572,001, filed on Oct. 13, 2017.

(51) Int. Cl.
*G10L 25/51* (2013.01)
*G10L 25/03* (2013.01)
*G01S 7/539* (2006.01)
*G01S 15/88* (2006.01)
*G01S 7/52* (2006.01)
*G01S 15/58* (2006.01)
*H04W 88/02* (2009.01)

(52) U.S. Cl.
CPC .............. *G01S 15/58* (2013.01); *G01S 15/88* (2013.01); *G10L 17/00* (2013.01); *G10L 25/51* (2013.01); *G10L 25/03* (2013.01); *H04W 88/02* (2013.01)

(56) References Cited

U.S. PATENT DOCUMENTS

| | | |
|---|---|---|
| 5,710,866 A | 1/1998 | Alleva et al. |
| 5,787,187 A | 7/1998 | Bouchard et al. |
| 5,838,515 A | 11/1998 | Mortazavi et al. |
| 6,182,037 B1 | 1/2001 | Maes |
| 6,229,880 B1 | 5/2001 | Reformato et al. |
| 6,249,237 B1 | 6/2001 | Prater |
| 6,343,269 B1 | 1/2002 | Harada et al. |
| 6,480,825 B1 | 11/2002 | Sharma et al. |
| 7,016,833 B2 | 3/2006 | Gable et al. |
| 7,039,951 B1 | 5/2006 | Chaudhari et al. |
| 7,418,392 B1 | 8/2008 | Mozer et al. |
| 7,492,913 B2 | 2/2009 | Connor et al. |
| 8,442,824 B2 | 5/2013 | Aley-Raz et al. |
| 8,489,399 B2 | 7/2013 | Gross |
| 8,577,046 B2 | 11/2013 | Aoyagi |
| 8,856,541 B1 | 10/2014 | Chaudhury et al. |
| 8,997,191 B1 | 3/2015 | Stark et al. |
| 9,049,983 B1 | 6/2015 | Baldwin |
| 9,171,548 B2 | 10/2015 | Valius et al. |
| 9,305,155 B1 | 4/2016 | Vo et al. |
| 9,317,736 B1 | 4/2016 | Siddiqui |
| 9,390,726 B1 | 7/2016 | Smus et al. |
| 9,430,629 B1 | 8/2016 | Ziraknejad et al. |
| 9,484,036 B2 | 11/2016 | Kons et al. |
| 9,548,979 B1 | 1/2017 | Johnson et al. |
| 9,600,064 B2 | 3/2017 | Lee et al. |
| 9,613,640 B1 | 4/2017 | Balamurali et al. |
| 9,641,585 B2 | 5/2017 | Kvaal et al. |
| 9,646,261 B2 | 5/2017 | Agrafioli et al. |
| 9,659,562 B2 | 5/2017 | Lovitt |
| 9,665,784 B2 | 5/2017 | Derakhshani et al. |
| 9,706,304 B1 | 7/2017 | Kelso et al. |
| 9,865,253 B1 | 1/2018 | De Leon et al. |
| 9,984,314 B2 | 5/2018 | Philipose et al. |
| 9,990,926 B1 | 6/2018 | Pearce |
| 10,032,451 B1 | 7/2018 | Mamkina et al. |
| 10,063,542 B1 | 8/2018 | Kao |
| 10,079,024 B1 | 9/2018 | Bhimanaik et al. |
| 10,097,914 B2 | 10/2018 | Petrank |
| 10,192,553 B1 | 1/2019 | Chenier et al. |
| 10,204,625 B2 | 2/2019 | Mishra et al. |
| 10,210,685 B2 | 2/2019 | Borgmeyer |
| 10,255,922 B1 | 4/2019 | Sharifi et al. |
| 10,277,581 B2 | 4/2019 | Chandrasekharan et al. |
| 10,305,895 B2 | 5/2019 | Barry et al. |
| 10,318,580 B2 | 6/2019 | Topchy et al. |
| 10,334,350 B2 | 6/2019 | Petrank |
| 10,339,290 B2 | 7/2019 | Valendi et al. |
| 10,460,095 B2 | 10/2019 | Boesen |
| 10,467,509 B2 | 11/2019 | Albadawi et al. |
| 10,692,492 B2 | 6/2020 | Rozen et al. |
| 10,733,987 B1 | 8/2020 | Govender et al. |
| 10,847,165 B2 | 11/2020 | Lesso |
| 10,915,614 B2 | 2/2021 | Lesso |
| 10,977,349 B2 | 4/2021 | Suh et al. |
| 11,017,252 B2 | 5/2021 | Lesso |
| 11,023,755 B2 | 6/2021 | Lesso |
| 11,037,574 B2 | 6/2021 | Lesso |
| 11,051,117 B2 | 6/2021 | Lesso |
| 11,164,588 B2 | 11/2021 | Alonso et al. |
| 11,276,409 B2 | 3/2022 | Lesso |
| 2002/0169608 A1 | 11/2002 | Tamir et al. |
| 2002/0194003 A1 | 12/2002 | Mozer |
| 2003/0033145 A1 | 2/2003 | Petrushin |
| 2003/0177006 A1 | 9/2003 | Ichikawa et al. |
| 2003/0177007 A1 | 9/2003 | Kanazawa et al. |
| 2003/0182119 A1 | 9/2003 | Junqua et al. |
| 2004/0030550 A1 | 2/2004 | Liu |
| 2004/0141418 A1 | 7/2004 | Matsuo et al. |
| 2004/0230432 A1 | 11/2004 | Liu et al. |
| 2005/0060153 A1 | 3/2005 | Gable et al. |
| 2005/0107130 A1 | 5/2005 | Peterson, II |
| 2005/0171774 A1 | 8/2005 | Applebaum et al. |
| 2006/0116874 A1 | 6/2006 | Samuelsson et al. |
| 2006/0171571 A1 | 8/2006 | Chan et al. |
| 2007/0055517 A1 | 3/2007 | Spector |
| 2007/0129941 A1 | 6/2007 | Tavares |
| 2007/0185718 A1 | 8/2007 | Di Mambro et al. |
| 2007/0233483 A1 | 10/2007 | Kuppuswamy et al. |
| 2007/0250920 A1 | 10/2007 | Lindsay |
| 2007/0276658 A1 | 11/2007 | Douglass |
| 2008/0040615 A1 | 2/2008 | Carper et al. |
| 2008/0071532 A1 | 3/2008 | Ramakrishnan et al. |
| 2008/0082510 A1 | 4/2008 | Wang et al. |
| 2008/0223646 A1 | 9/2008 | White |
| 2008/0262382 A1 | 10/2008 | Akkermans et al. |
| 2008/0285813 A1 | 11/2008 | Holm |
| 2009/0087003 A1 | 4/2009 | Zurek et al. |
| 2009/0105548 A1 | 4/2009 | Bart |
| 2009/0167307 A1 | 7/2009 | Kopp |
| 2009/0232361 A1 | 9/2009 | Miller |
| 2009/0281809 A1 | 11/2009 | Reuss |
| 2009/0319270 A1 | 12/2009 | Gross |
| 2010/0004934 A1 | 1/2010 | Hirose et al. |
| 2010/0076770 A1 | 3/2010 | Ramaswamy |
| 2010/0106502 A1 | 4/2010 | Farrell et al. |
| 2010/0106503 A1 | 4/2010 | Farrell et al. |
| 2010/0204991 A1 | 8/2010 | Ramakrishnan et al. |
| 2010/0328033 A1 | 12/2010 | Kamei |
| 2011/0051907 A1 | 3/2011 | Jaiswal et al. |
| 2011/0075857 A1 | 3/2011 | Aoyagi |
| 2011/0142268 A1 | 6/2011 | Iwakuni et al. |
| 2011/0246198 A1 | 10/2011 | Asenjo et al. |
| 2011/0276323 A1 | 11/2011 | Seyfetdinov |
| 2011/0314530 A1 | 12/2011 | Donaldson |
| 2011/0317848 A1 | 12/2011 | Ivanov et al. |
| 2012/0110341 A1 | 5/2012 | Beigi |
| 2012/0223130 A1 | 9/2012 | Knopp et al. |
| 2012/0224456 A1 | 9/2012 | Visser et al. |
| 2012/0249328 A1 | 10/2012 | Xiong |
| 2012/0323796 A1 | 12/2012 | Udani |
| 2013/0024191 A1 | 1/2013 | Krutsch et al. |
| 2013/0058488 A1 | 3/2013 | Cheng et al. |
| 2013/0080167 A1 | 3/2013 | Mozer |
| 2013/0132091 A1 | 5/2013 | Skerpac |
| 2013/0225128 A1 | 8/2013 | Gomar |
| 2013/0227678 A1 | 8/2013 | Kang |
| 2013/0247082 A1 | 9/2013 | Wang et al. |
| 2013/0279297 A1 | 10/2013 | Wulff et al. |
| 2013/0279724 A1 | 10/2013 | Stafford et al. |
| 2013/0289999 A1 | 10/2013 | Hymel |
| 2014/0059347 A1 | 2/2014 | Dougherty et al. |
| 2014/0149117 A1 | 5/2014 | Bakish et al. |
| 2014/0172430 A1 | 6/2014 | Rutherford et al. |
| 2014/0188770 A1 | 7/2014 | Agrafioti et al. |
| 2014/0237576 A1 | 8/2014 | Zhang et al. |
| 2014/0241597 A1 | 8/2014 | Leite |
| 2014/0293749 A1 | 10/2014 | Gervaise |
| 2014/0307876 A1 | 10/2014 | Agiomyrgiannakis et al. |
| 2014/0330568 A1 | 11/2014 | Lewis et al. |
| 2014/0337945 A1 | 11/2014 | Jia et al. |
| 2014/0343703 A1 | 11/2014 | Topchy et al. |

(56) References Cited

U.S. PATENT DOCUMENTS

| | | |
|---|---|---|
| 2014/0358353 A1 | 12/2014 | Ibanez-Guzman et al. |
| 2014/0358535 A1 | 12/2014 | Lee et al. |
| 2015/0006163 A1 | 1/2015 | Liu et al. |
| 2015/0028996 A1 | 1/2015 | Agrafioti et al. |
| 2015/0033305 A1 | 1/2015 | Shear et al. |
| 2015/0036462 A1 | 2/2015 | Calvarese |
| 2015/0088509 A1 | 3/2015 | Gimenez et al. |
| 2015/0089616 A1 | 3/2015 | Brezinski et al. |
| 2015/0112682 A1 | 4/2015 | Rodriguez et al. |
| 2015/0134330 A1 | 5/2015 | Baldwin et al. |
| 2015/0161370 A1 | 6/2015 | North et al. |
| 2015/0161459 A1 | 6/2015 | Boczek |
| 2015/0168996 A1 | 6/2015 | Sharpe et al. |
| 2015/0245154 A1 | 8/2015 | Dadu et al. |
| 2015/0261944 A1 | 9/2015 | Hosom et al. |
| 2015/0276254 A1 | 10/2015 | Nemcek et al. |
| 2015/0301796 A1 | 10/2015 | Visser et al. |
| 2015/0332665 A1 | 11/2015 | Mishra et al. |
| 2015/0347734 A1 | 12/2015 | Beigi |
| 2015/0356974 A1 | 12/2015 | Tani et al. |
| 2015/0371639 A1 | 12/2015 | Foerster et al. |
| 2016/0007118 A1 | 1/2016 | Lee et al. |
| 2016/0026781 A1 | 1/2016 | Boczek |
| 2016/0066113 A1 | 3/2016 | Elkhatib et al. |
| 2016/0071516 A1 | 3/2016 | Lee et al. |
| 2016/0086607 A1 | 3/2016 | Aley-Raz et al. |
| 2016/0086609 A1 | 3/2016 | Yue et al. |
| 2016/0111112 A1 | 4/2016 | Hayakawa |
| 2016/0125877 A1 | 5/2016 | Foerster et al. |
| 2016/0125879 A1 | 5/2016 | Lovitt |
| 2016/0147987 A1 | 5/2016 | Jang et al. |
| 2016/0148012 A1 | 5/2016 | Khitrov et al. |
| 2016/0182998 A1 | 6/2016 | Galal et al. |
| 2016/0210407 A1 | 7/2016 | Hwang et al. |
| 2016/0217321 A1 | 7/2016 | Gottleib |
| 2016/0217795 A1 | 7/2016 | Lee et al. |
| 2016/0234204 A1 | 8/2016 | Rishi et al. |
| 2016/0248768 A1 | 8/2016 | McLaren et al. |
| 2016/0314790 A1 | 10/2016 | Tsujikawa et al. |
| 2016/0324478 A1 | 11/2016 | Goldstein |
| 2016/0330198 A1 | 11/2016 | Stern et al. |
| 2016/0371555 A1 | 12/2016 | Derakhshani |
| 2016/0372139 A1 | 12/2016 | Cho et al. |
| 2017/0011406 A1 | 1/2017 | Tunnell et al. |
| 2017/0049335 A1 | 2/2017 | Duddy |
| 2017/0068805 A1 | 3/2017 | Chandrasekharan et al. |
| 2017/0078780 A1 | 3/2017 | Qian et al. |
| 2017/0110117 A1 | 4/2017 | Chakladar et al. |
| 2017/0110121 A1 | 4/2017 | Warford et al. |
| 2017/0112671 A1 | 4/2017 | Goldstein |
| 2017/0116995 A1 | 4/2017 | Ady et al. |
| 2017/0134377 A1 | 5/2017 | Tokunaga et al. |
| 2017/0150254 A1 | 5/2017 | Bakish et al. |
| 2017/0161482 A1 | 6/2017 | Eltoft et al. |
| 2017/0162198 A1 | 6/2017 | Chakladar et al. |
| 2017/0169828 A1 | 6/2017 | Sachdev |
| 2017/0200451 A1 | 7/2017 | Booklet et al. |
| 2017/0213268 A1 | 7/2017 | Puehse et al. |
| 2017/0214687 A1 | 7/2017 | Klein et al. |
| 2017/0231534 A1 | 8/2017 | Agassy et al. |
| 2017/0242990 A1 | 8/2017 | Chien |
| 2017/0256270 A1 | 9/2017 | Singaraju et al. |
| 2017/0279815 A1 | 9/2017 | Chung et al. |
| 2017/0287490 A1 | 10/2017 | Biswal et al. |
| 2017/0293749 A1 | 10/2017 | Baek et al. |
| 2017/0323644 A1 | 11/2017 | Kawato |
| 2017/0347180 A1 | 11/2017 | Petrank |
| 2017/0347348 A1 | 11/2017 | Masaki et al. |
| 2017/0351487 A1 | 12/2017 | Aviles-Casco Vaquero et al. |
| 2017/0373655 A1 | 12/2017 | Mengad et al. |
| 2018/0018974 A1 | 1/2018 | Zass |
| 2018/0032712 A1 | 2/2018 | Oh et al. |
| 2018/0039769 A1 | 2/2018 | Saunders et al. |
| 2018/0047393 A1 | 2/2018 | Tian et al. |
| 2018/0060552 A1 | 3/2018 | Pellom et al. |
| 2018/0060557 A1 | 3/2018 | Valenti et al. |
| 2018/0096120 A1 | 4/2018 | Boesen |
| 2018/0107866 A1 | 4/2018 | Li et al. |
| 2018/0108225 A1 | 4/2018 | Mappus et al. |
| 2018/0113673 A1 | 4/2018 | Sheynblat |
| 2018/0121161 A1 | 5/2018 | Ueno et al. |
| 2018/0146370 A1 | 5/2018 | Krishnaswamy et al. |
| 2018/0166071 A1 | 6/2018 | Lee et al. |
| 2018/0174600 A1 | 6/2018 | Chaudhuri et al. |
| 2018/0176215 A1 | 6/2018 | Perotti et al. |
| 2018/0187969 A1 | 7/2018 | Kim et al. |
| 2018/0191501 A1 | 7/2018 | Lindemann |
| 2018/0232201 A1 | 8/2018 | Holtmann |
| 2018/0232511 A1 | 8/2018 | Bakish |
| 2018/0233142 A1 | 8/2018 | Koishida et al. |
| 2018/0239955 A1 | 8/2018 | Rodriguez et al. |
| 2018/0240463 A1 | 8/2018 | Perotti |
| 2018/0254046 A1 | 9/2018 | Khoury et al. |
| 2018/0289354 A1 | 10/2018 | Cvijanovic et al. |
| 2018/0292523 A1 | 10/2018 | Orenstein et al. |
| 2018/0308487 A1 | 10/2018 | Goel et al. |
| 2018/0324518 A1 | 11/2018 | Dusan et al. |
| 2018/0330727 A1 | 11/2018 | Tulli |
| 2018/0336716 A1 | 11/2018 | Ramprashad et al. |
| 2018/0336901 A1 | 11/2018 | Masaki et al. |
| 2018/0342237 A1 | 11/2018 | Lee et al. |
| 2018/0349585 A1 | 12/2018 | Ahn et al. |
| 2018/0352332 A1 | 12/2018 | Tao |
| 2018/0358020 A1 | 12/2018 | Chen et al. |
| 2018/0366124 A1 | 12/2018 | Cilingir et al. |
| 2018/0374487 A1 | 12/2018 | Lesso |
| 2018/0376234 A1 | 12/2018 | Petrank |
| 2019/0005963 A1 | 1/2019 | Alonso et al. |
| 2019/0005964 A1 | 1/2019 | Alonso et al. |
| 2019/0013033 A1 | 1/2019 | Bhimanaik et al. |
| 2019/0027152 A1 | 1/2019 | Huang et al. |
| 2019/0030452 A1 | 1/2019 | Fassbender et al. |
| 2019/0042871 A1 | 2/2019 | Pogorelik |
| 2019/0043512 A1 | 2/2019 | Huang et al. |
| 2019/0065478 A1 | 2/2019 | Tsujikawa et al. |
| 2019/0098003 A1 | 3/2019 | Ota |
| 2019/0103115 A1 | 4/2019 | Lesso |
| 2019/0114496 A1 | 4/2019 | Lesso |
| 2019/0114497 A1 | 4/2019 | Lesso |
| 2019/0115030 A1 | 4/2019 | Lesso |
| 2019/0115032 A1 | 4/2019 | Lesso |
| 2019/0115033 A1 | 4/2019 | Lesso |
| 2019/0115046 A1 | 4/2019 | Lesso |
| 2019/0122670 A1 | 4/2019 | Roberts et al. |
| 2019/0147888 A1 | 5/2019 | Lesso |
| 2019/0149920 A1 | 5/2019 | Putzeys et al. |
| 2019/0149932 A1 | 5/2019 | Lesso |
| 2019/0180014 A1 | 6/2019 | Kovvali et al. |
| 2019/0197755 A1 | 6/2019 | Vats |
| 2019/0199139 A1* | 6/2019 | Perry .................... H02J 50/12 |
| 2019/0199935 A1 | 6/2019 | Danielsen et al. |
| 2019/0228778 A1 | 7/2019 | Lesso |
| 2019/0228779 A1 | 7/2019 | Lesso |
| 2019/0246075 A1 | 8/2019 | Khadloya et al. |
| 2019/0260731 A1 | 8/2019 | Chandrasekharan et al. |
| 2019/0294629 A1 | 9/2019 | Wexler et al. |
| 2019/0295554 A1 | 9/2019 | Lesso |
| 2019/0304470 A1 | 10/2019 | Ghaeemaghami et al. |
| 2019/0306594 A1 | 10/2019 | Aumer et al. |
| 2019/0306613 A1 | 10/2019 | Qian et al. |
| 2019/0311722 A1 | 10/2019 | Caldwell |
| 2019/0313014 A1 | 10/2019 | Welbourne et al. |
| 2019/0318035 A1 | 10/2019 | Blanco et al. |
| 2019/0356588 A1 | 11/2019 | Shahraray et al. |
| 2019/0371330 A1 | 12/2019 | Lin et al. |
| 2019/0372969 A1 | 12/2019 | Chang et al. |
| 2019/0373438 A1 | 12/2019 | Amir et al. |
| 2019/0392145 A1 | 12/2019 | Komogortsev |
| 2019/0394195 A1 | 12/2019 | Chari et al. |
| 2020/0035247 A1 | 1/2020 | Boyadjiev et al. |
| 2020/0184057 A1 | 6/2020 | Mukund |
| 2020/0204937 A1 | 6/2020 | Lesso |
| 2020/0227071 A1 | 7/2020 | Lesso |

(56) References Cited

U.S. PATENT DOCUMENTS

| | | | |
|---|---|---|---|
| 2020/0265834 | A1 | 8/2020 | Lesso et al. |
| 2020/0286492 | A1 | 9/2020 | Lesso |
| 2021/0303669 | A1 | 9/2021 | Lesso |

FOREIGN PATENT DOCUMENTS

| | | | |
|---|---|---|---|
| CN | 1937955 | A | 3/2007 |
| CN | 200820218 | A | 5/2008 |
| CN | 101228787 | A | 7/2008 |
| CN | 101578637 | A | 11/2009 |
| CN | 102246228 | A | 11/2011 |
| CN | 103109495 | A | 5/2013 |
| CN | 103477604 | A | 12/2013 |
| CN | 104038625 | A | 9/2014 |
| CN | 104252860 | A | 12/2014 |
| CN | 104956715 | A | 9/2015 |
| CN | 105185380 | A | 12/2015 |
| CN | 105244031 | A | 1/2016 |
| CN | 105702263 | A | 6/2016 |
| CN | 105869630 | A | 8/2016 |
| CN | 105913855 | A | 8/2016 |
| CN | 105933272 | A | 9/2016 |
| CN | 105938716 | A | 9/2016 |
| CN | 106297772 | A | 1/2017 |
| CN | 106531172 | A | 3/2017 |
| CN | 106537889 | A | 3/2017 |
| CN | 107251573 | A | 10/2017 |
| EP | 1205884 | A2 | 5/2002 |
| EP | 1600791 | A1 | 11/2005 |
| EP | 1701587 | A1 | 9/2006 |
| EP | 1928213 | A1 | 6/2008 |
| EP | 1965331 | A2 | 9/2008 |
| EP | 2660813 | A1 | 11/2013 |
| EP | 2704052 | A2 | 3/2014 |
| EP | 2860706 | A2 | 4/2015 |
| EP | 3016314 | A1 | 5/2016 |
| EP | 3156978 | A1 | 4/2017 |
| EP | 3466106 | A1 | 4/2019 |
| GB | 2375205 | A | 11/2002 |
| GB | 2493849 | A | 2/2013 |
| GB | 2499781 | A | 9/2013 |
| GB | 2515527 | A | 12/2014 |
| GB | 2541466 | A | 2/2017 |
| GB | 2551209 | A | 12/2017 |
| JP | 2003058190 | A | 2/2003 |
| JP | 2006010809 | A | 1/2006 |
| JP | 2010086328 | A | 4/2010 |
| WO | 9834216 | A2 | 8/1998 |
| WO | 02080147 | A1 | 10/2002 |
| WO | 02/103680 | A2 | 12/2002 |
| WO | 2006054205 | A1 | 5/2006 |
| WO | 2007034371 | A2 | 3/2007 |
| WO | 2008113024 | A1 | 9/2008 |
| WO | 2010066269 | A1 | 6/2010 |
| WO | 2013022930 | A1 | 2/2013 |
| WO | 2013154790 | A1 | 10/2013 |
| WO | 2014040124 | A1 | 3/2014 |
| WO | 2015117674 | A1 | 8/2015 |
| WO | 2015163774 | A1 | 10/2015 |
| WO | 2016003299 | A1 | 1/2016 |
| WO | 2017055551 | A | 4/2017 |
| WO | 2017203484 | A1 | 11/2017 |
| WO | 2019002831 | A1 | 1/2019 |
| WO | 2019008387 | A1 | 1/2019 |
| WO | 2019008389 | A1 | 1/2019 |
| WO | 2019008392 | A1 | 1/2019 |

OTHER PUBLICATIONS

Wikipedia, Voice (phonetics), https://en.wikipedia.org/wiki/Voice_(phonetics), accessed Jun. 1, 2020.
Zhang et al., DolphinAttack: Inaudible Voice Commands, Retrieved from Proceedings of the 2017 ACM SIGSAC Conference on Computer and Communications Security, Aug. 2017.
Song, Liwei, and Prateek Mittal, Poster: Inaudible Voice Commands, Proceedings of the 2017 ACM SIGSAC Conference on Computer and Communications Security, Aug. 2017.
Fortuna, Andrea, [Online], DolphinAttack: inaudiable voice commands allow attackers to control Siri, Alexa and other digital assistants, Sep. 2017.
First Office Action, China National Intellectual Property Administration, Patent Application No. 2018800418983, dated May 29, 2020.
International Search Report and Written Opinion, International Application No. PCT/GB2020/050723, dated Jun. 16, 2020.
Liu, Yuxi et al., "Earprint: Transient Evoked Otoacoustic Emission for Biometrics", IEEE Transactions on Information Forensics and Security, IEEE, Piscataway, NJ, US, vol. 9, No. 12, Dec. 1, 2014, pp. 2291-2301.
Seha, Sherif Nagib Abbas et al., "Human recognition using transient auditory evoked potentials: a preliminary study", IET Biometrics, IEEE, Michael Faraday House, Six Hills Way, Stevenage, HERTS., UK, vol. 7, No. 3, May 1, 2018, pp. 242-250.
Liu, Yuxi et al., "Biometric identification based on Transient Evoked Otoacoustic Emission", IEEE International Symposium on Signal Processing and Information Technology, IEEE, Dec. 12, 2013, pp. 267-271.
First Office Action, China National Intellectual Property Administration, Application No. 2018800720846, dated Mar. 1, 2021.
Boesen, U.S. Appl. No. 62/403,045, filed Sep. 30, 2017.
Mieng, Y. et al., "Liveness Detection for Voice User Interface via Wireless Signals in IoT Environment," in IEEE Transactions on Dependable and Secure Computing, doi: 10.1109/TDSC.2020.2973620.
Zhang, L. et al., Hearing Your Voice is Not Enough: An Articulatory Gesture Based Liveness Detection for Voice Authentication, CCS '17: Proceedings of the 2017 ACM SIGSAC Conference on Computer and Communications Security, Oct. 2017 pp. 57-71.
Toth, Arthur R., et al., Synthesizing Speech from Doppler Signals, ICASSP 2010, IEEE, pp. 4638-4641.
International Search Report and Written Opinion of the International Searching Authority, International Application No. PCT/GB2019/052302, dated Oct. 2, 2019.
Liu, Yuan et al., "Speaker verification with deep features", Jul. 2014, in International Joint Conference on Neural networks (IJCNN), pp. 747-753, IEEE.
International Search Report and Written Opinion of the International Searching Authority, International Application No. PCT/GB2018/051927, dated Sep. 25, 2018.
Combined Search and Examination Report under Sections 17 and 18(3), UKIPO, Application No. 1801530.5, dated Jul. 25, 2018.
International Search Report and Written Opinion of the International Searching Authority, International Application No. PCT/GB2018/051924, dated Sep. 26, 2018.
Combined Search and Examination Report under Sections 17 and 18(3), UKIPO, Application No. 1801526.3, dated Jul. 25, 2018.
International Search Report and Written Opinion of the International Searching Authority, International Application No. PCT/GB2018/051931, dated Sep. 27, 2018.
Combined Search and Examination Report under Sections 17 and 18(3), UKIPO, Application No. 1801527.1, dated Jul. 25, 2018.
International Search Report and Written Opinion of the International Searching Authority, International Application No. PCT/GB2018/051925, dated Sep. 26, 2018.
Combined Search and Examination Report under Sections 17 and 18(3), UKIPO, Application No. 1801528.9, dated Jul. 25, 2018.
International Search Report and Written Opinion of the International Searching Authority, International Application No. PCT/GB2018/051928, dated Dec. 3, 2018.
Combined Search and Examination Report under Sections 17 and 18(3), UKIPO, Application No. 1801532.1, dated Jul. 25, 2018.
Lim, Zhi Hao et al., An Investigation of Spectral Feature Partitioning for Replay Attacks Detection, Proceedings of APSIPA Annual Summit and Conference 2017, Dec. 12-15, 2017, Malaysia, pp. 1570-1573.

(56) References Cited

OTHER PUBLICATIONS

International Search Report and Written Opinion of the International Searching Authority, International Application No. PCT/GB2018/053274, dated Jan. 24, 2019.
Beigi, Homayoon, "Fundamentals of Speaker Recognition," Chapters 8-10, ISBN: 978-0-378-77592-0; 2011.
Li, Lantian et al., "A Study on Replay Attack and Anti-Spoofing for Automatic Speaker Verification", Interspeech 2017, Jan. 1, 2017, pp. 92-96.
Li, Zhi et al., "Compensation of Hysteresis Nonlinearity in Magnetostrictive Actuators with Inverse Multiplicative Structure for Preisach Model", IEE Transactions on Automation Science and Engineering, vol. 11, No. 2, Apr. 1, 2014, pp. 613-619.
Partial International Search Report of the International Searching Authority, International Application No. PCT/GB2018/052905, dated Jan. 25, 2019.
Further Search Report under Sections 17 (6), UKIPO, Application No. GB1719731.0, dated Nov. 26, 2018.
Combined Search and Examination Report, UKIPO, Application No. GB1713695.3, dated Feb. 19, 2018.
Zhang et al., An Investigation of Deep-Learing Frameworks for Speaker Verification Antispoofing—IEEE Journal of Selected Topics in Signal Processes, Jun. 1, 2017.
Combined Search and Examination Report under Sections 17 and 18(3), UKIPO, Application No. GB1804843.9, dated Sep. 27, 2018.
Wu et al., Anti-Spoofing for text-Independent Speaker Verification: An Initial Database, Comparison of Countermeasures, and Human Performance, IEEE/ACM Transactions on Audio, Speech, and Language Processing, Issue Date: Apr. 2016.
Combined Search and Examination Report under Sections 17 and 18(3), UKIPO, Application No. GB1803570.9, dated Aug. 21, 2018.
Combined Search and Examination Report under Sections 17 and 18(3), UKIPO, Application No. GB1801661.8, dated Jul. 30, 2018.
Combined Search and Examination Report under Sections 17 and 18(3), UKIPO, Application No. GB1801663.4, dated Jul. 18, 2018.
Combined Search and Examination Report under Sections 17 and 18(3), UKIPO, Application No. GB1801664.2, dated Aug. 1, 2018.
Combined Search and Examination Report under Sections 17 and 18(3), UKIPO, Application No. GB1719731.0, dated May 16, 2018.
Combined Search and Examination Report, UKIPO, Application No. GB1801874.7, dated Jul. 25, 2018.
Combined Search and Examination Report under Sections 17 and 18(3), UKIPO, Application No. GB1801659.2, dated Jul. 26, 2018.
International Search Report and Written Opinion of the International Searching Authority, International Application No. PCT/GB2018/052906, dated Jan. 14, 2019.
International Search Report and Written Opinion of the International Searching Authority, International Application No. PCT/GB2019/050185, dated Apr. 2, 2019.
Combined Search and Examination Report under Sections 17 and 18(3), UKIPO, Application No. GB1809474.8, dated Jul. 23, 2018.
Ajmera, et al. "Robust Speaker Change Detection," IEEE Signal Processing Letters, vol. 11, No. 8, pp. 649-651, Aug. 2004.
International Search Report and Written Opinion of the International Searching Authority, International Application No. PCT/GB2018/051760, dated Aug. 3, 2018.
International Search Report and Written Opinion of the International Searching Authority, International Application No. PCT/GB2018/051787, dated Aug. 16, 2018.
Villalba, Jesus et al., Preventing Replay Attacks on Speaker Verification Systems, International Carnahan Conference on Security Technology (ICCST), 2011 IEEE, Oct. 18, 2011, pp. 1-8.
International Search Report and Written Opinion of the International Searching Authority, International Application No. PCT/GB2018/051765, dated Aug. 16, 2018.
Combined Search and Examination Report under Sections 17 and 18(3), UKIPO, Application No. GB1713697.9, dated Feb. 20, 2018.
Chen et al., "You Can Hear But You Cannot Steal: Defending Against Voice Impersonation Attacks on Smartphones", Proceedings of the International Conference on Distributed Computing Systems, PD: 20170605.
International Search Report and Written Opinion of the International Searching Authority, International Application No. PCT/GB2018/052907, dated Jan. 15, 2019.
Combined Search and Examination Report under Sections 17 and 18(3), UKIPO, Application No. GB1713699.5, dated Feb. 21, 2018.
International Search Report and Written Opinion of the International Searching Authority, International Application No. PCT/GB2019/052143, dated Sep. 17, 2019.
Lucas, Jim, What Is Electromagnetic Radiation? Live Science, Mar. 13, 2015, NY, NY.
Brownlee, Jason, A Gentle Introduction to Autocorrelation and Partial Autocorrelation, Feb. 6, 2017, https://machinelearningmastery.com/gentle-introduction-autocorrelation-partial-autocorrelation/, accessed Apr. 28, 2020.
Wu, Libing, et al., LVID: A Multimodal Biometricas Authentication System on Smartphones, IEEE Transactions on Information Forensics and Security, Vo. 15, 2020, pp. 1572-1585.
Wang, Qian, et al., VoicePop: A Pop Noise based Anti-spoofing System for Voice Authentication on Smartphones, IEEE INFOCOM 2019—IEEE Conference on Computer Communications, Apr. 29-May 2, 2019, pp. 2062-2070.
Examination Report under Section 18(3), UKIPO, Application No. GB1918956.2, dated Jul. 29, 2021.
Examination Report under Section 18(3), UKIPO, Application No. GB1918965.3, dated Aug. 2, 2021.
Combined Search and Examination Report under Sections 17 and 18(3), UKIPO, Application No. GB2105613.0, dated Sep. 27, 2021.
Combined Search and Examination Report under Sections 17 and 18(3), UKIPO, Application No. GB2114337.5, dated Nov. 3, 2021.
Combined Search and Examination Report under Sections 17 and 18(3), UKIPO, Application No. GB2112228.8, dated May 17, 2022.
Search Report under Section 17, UKIPO, Application No. GB2202521.7, dated Jun. 21, 2022.
Combined Search and Examination Report under Sections 17 and 18(3), UKIPO, Application No. GB2210986.2, dated Nov. 15, 2022.
First Office Action, China National Intellectual Property Administration, Application No. 201800658351, dated Feb. 4, 2023.
Search Report, China National Intellectual Property Administration, Application No. 201800658351, dated Feb. 2, 2023.
First Office Action, China National Intellectual Property Administration, Patent Application No. 2018800452077, dated Feb. 25, 2023.
First Office Action, China National Intellectual Property Administration, Patent Application No. 2018800452787, dated Mar. 14, 2023.
First Office Action, China National Intellectual Property Administration, Patent Application No. 2018800419187, dated Feb. 28, 2023.
Notice of Preliminary Rejection, Korean Intellectual Property Office, Patent Application No. 10-2020-7002065, dated Apr. 17, 2023.
Notice of Preliminary Rejection, Korean Intellectual Property Office, Patent Application No. 10-2020-7002061, dated Apr. 27, 2023.

* cited by examiner

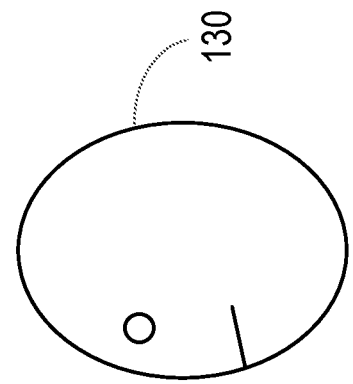
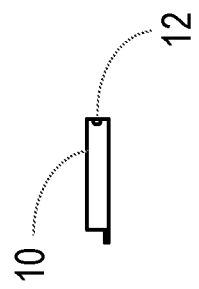
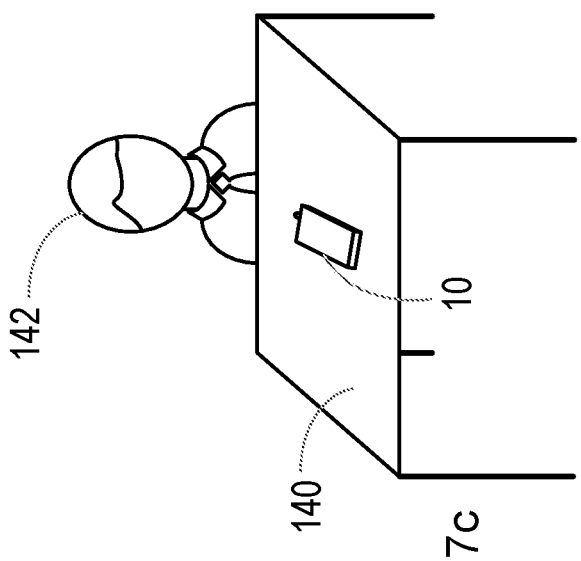
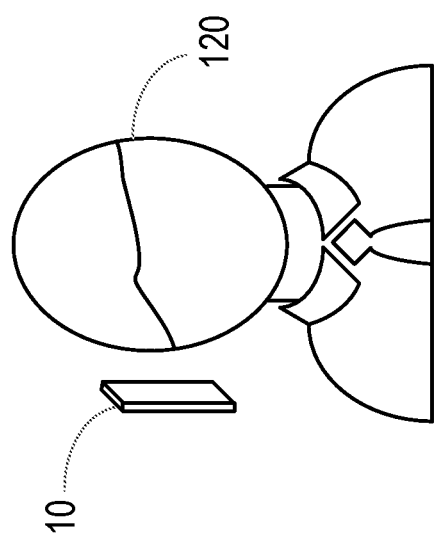
Figure 7a
Figure 7b
Figure 7c

DETECTION OF LIVENESS This application is a continuation of U.S. patent application Ser. No. 16/156,623, filed Oct. 10, 2018, which claims priority to U.S. Provisional Patent Application Ser. No. 62/572,001, filed Oct. 13, 2017, and United Kingdom Patent Application No. 1801664.2, filed Feb. 1, 2018, each of which is incorporated by reference herein in its entirety.

TECHNICAL FIELD

Embodiments described herein relate to methods and devices for detecting liveness of a speaker. As one example, the liveness detection can be used for detecting a replay attack on a voice biometrics system.

BACKGROUND

Biometrics systems are becoming widely used. In a voice biometrics system, a user trains the system by providing samples of their speech during an enrolment phase. In subsequent use, the system is able to discriminate between the enrolled user and non-registered speakers. Voice biometrics systems can in principle be used to control access to a wide range of services and systems.

One way for a malicious party to attempt to defeat a voice biometrics system is to obtain a recording of the enrolled user's speech, and to play back the recording in an attempt to impersonate the enrolled user and to gain access to services that are intended to be restricted to the enrolled user.

This is referred to as a replay attack, or as a spoofing attack.

In a facial recognition, or other type of biometrics system, the system recognises a characteristic of the user. Again, one way for a malicious party to attempt to defeat such a biometrics system is to present the system with a photograph or video recording of the enrolled user.

SUMMARY

According to an aspect of the present invention, there is provided a method of liveness detection in a device. The method comprises: receiving a speech signal from a voice source; generating and transmitting an ultrasound signal through a transducer of the device; detecting a reflection of the transmitted ultrasound signal; detecting Doppler shifts in the reflection of the generated ultrasound signal; and identifying whether the received speech signal is indicative of liveness of a speaker based on the detected Doppler shifts. The method further comprises: obtaining information about a position of the device; and adapting the generating and transmitting of the ultrasound signal based on the information about the position of the device.

According to another aspect of the present invention, there is provided a system for liveness detection, the system being configured for performing the method of the first aspect.

According to another aspect of the present invention, there is provided a device comprising such a system. The device may comprise a mobile telephone, an audio player, a video player, a mobile computing platform, a games device, a remote controller device, a toy, a machine, or a home automation controller or a domestic appliance.

According to another aspect of the present invention, there is provided a computer program product, comprising a computer-readable tangible medium, and instructions for performing a method according to the first aspect.

According to another aspect of the present invention, there is provided a non-transitory computer readable storage medium having computer-executable instructions stored thereon that, when executed by processor circuitry, cause the processor circuitry to perform a method according to the first aspect. According to a further aspect, there is provided a device comprising the non-transitory computer readable storage medium. The device may comprise a mobile telephone, an audio player, a video player, a mobile computing platform, a games device, a remote controller device, a toy, a machine, or a home automation controller or a domestic appliance.

BRIEF DESCRIPTION OF DRAWINGS

For a better understanding of the present invention, and to show how it may be put into effect, reference will now be made to the accompanying drawings, in which:

FIGS. 7a, 7b, and 7c illustrate various possible uses of smartphones;

DETAILED DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

One example of the invention is illustrated with reference to its use in a smartphone, by way of example, though it will be appreciated that it may be implemented in any suitable device, as described in more detail below.

Figure 1:
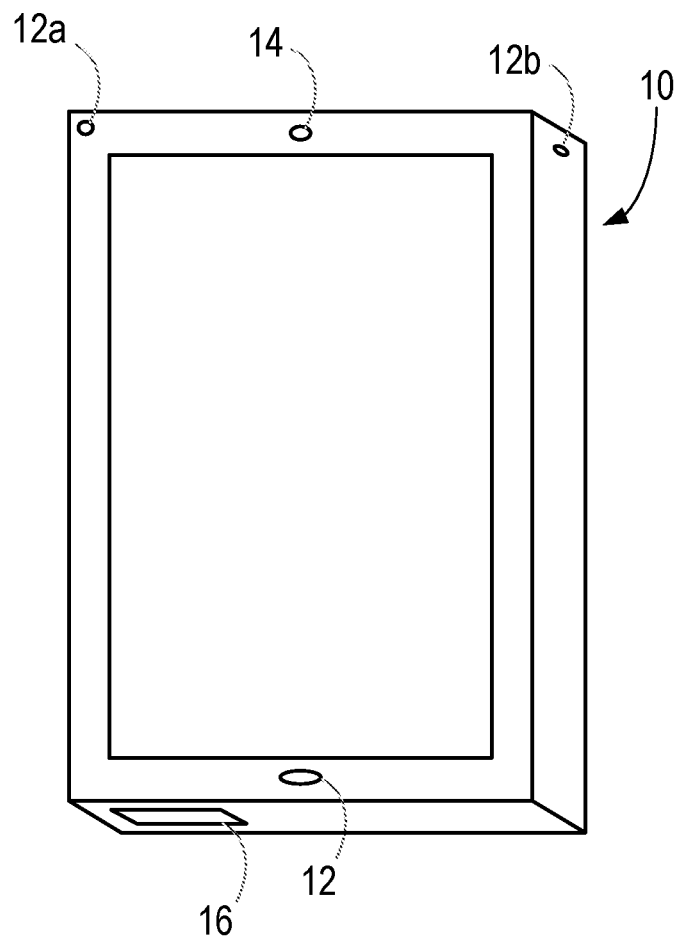
FIG. 1 illustrates a smartphone.

FIG. 1 illustrates a smartphone 10, having a microphone 12 for detecting ambient sounds. In normal use, the microphone is of course used for detecting the speech of a user who is holding the smartphone 10.

The smartphone 10 also has two loudspeakers 14, 16. The first loudspeaker 14 is located at the top of the smartphone 10, when it is held in its normal operating position for making a voice call, and is used for playing the sounds that are received from the remote party to the call.

The second loudspeaker 16 is located at the bottom of the smartphone 10, and is used for playing back media content from local or remote sources. Thus, the second loudspeaker 16 is used for playing back music that is stored on the smartphone 10 or sounds associated with videos that are being accessed over the internet.

The illustrated smartphone 10 also has two additional microphones 12a, 12b. The additional microphones, if present in the device, may be provided at any suitable location. In this illustrated device, one microphone 12a is located at the top end of the front of the device, while another microphone 12b is located at the top end of the side of the device.

Figure 2:
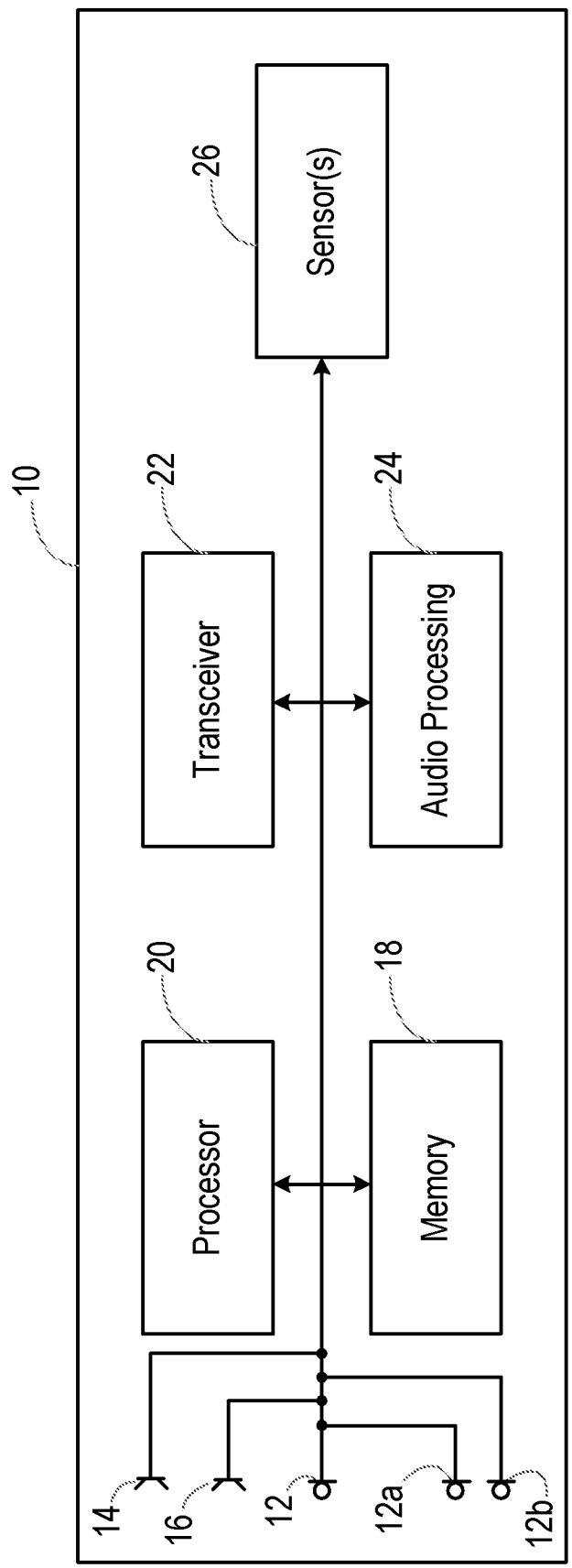
FIG. 2 is a schematic diagram, illustrating the form of the smartphone.

FIG. 2 is a schematic diagram, illustrating the form of the smartphone 10.

Specifically, FIG. 2 shows various interconnected components of the smartphone 10. It will be appreciated that the smartphone 10 will in practice contain many other components, but the following description is sufficient for an understanding of the present invention.

Thus, FIG. 2 shows the microphone 12 mentioned above. In this particular illustrated embodiment, the smartphone 10 is provided with multiple microphones 12, 12a, 12b, etc. FIG. 2 also shows the loudspeakers 14, 16.

FIG. 2 also shows a memory 18, which may in practice be provided as a single component or as multiple components. The memory 18 is provided for storing data and program instructions.

FIG. 2 also shows a processor 20, which again may in practice be provided as a single component or as multiple components. For example, one component of the processor 20 may be an applications processor of the smartphone 10.

FIG. 2 also shows a transceiver 22, which is provided for allowing the smartphone 10 to communicate with external networks. For example, the transceiver 22 may include circuitry for establishing an internet connection over a WiFi local area network and/or over a cellular network.

FIG. 2 also shows audio processing circuitry 24, for performing operations on the audio signals detected by the microphone 12 as required. For example, the audio processing circuitry 24 may filter the audio signals or perform other signal processing operations.

The audio signal processing circuitry is also able to generate audio signals for playback through the loudspeakers 14, 16, as discussed in more detail below.

FIG. 2 also shows that the smartphone 10 may include one or more sensors 26. In certain embodiments, the sensor(s) may include any combination of the following: gyroscopes, accelerometers, proximity sensors, light level sensors, touch sensors, and a camera.

In this illustrated embodiment, the smartphone 10 is provided with voice biometric functionality, and with control functionality. Thus, the smartphone 10 is able to perform various functions in response to spoken commands from an enrolled user. The biometric functionality is able to distinguish between spoken commands from the enrolled user, and the same commands when spoken by a different person. Thus, certain embodiments of the invention relate to operation of a smartphone or another portable electronic device with some sort of voice operability, for example a tablet or laptop computer, a games console, a home control system, a home entertainment system, an in-vehicle entertainment system, a domestic appliance, or the like, in which the voice biometric functionality is performed in the device that is intended to carry out the spoken command. Certain other embodiments relate to systems in which the voice biometric functionality is performed on a smartphone or other device, which then transmits the commands to a separate device if the voice biometric functionality is able to confirm that the speaker was the enrolled user.

In some embodiments, while voice biometric functionality is performed on the smartphone 10 or other device that is located close to the user, the spoken commands are transmitted using the transceiver 22 to a remote speech recognition system, which determines the meaning of the spoken commands. For example, the speech recognition system may be located on one or more remote server in a cloud computing environment. Signals based on the meaning of the spoken commands are then returned to the smartphone 10 or other local device. In other embodiments, the speech recognition system is also located on the device 10.

One attempt to deceive a voice biometric system is to play a recording of an enrolled user's voice in a so-called replay or spoof attack.

Figure 3:
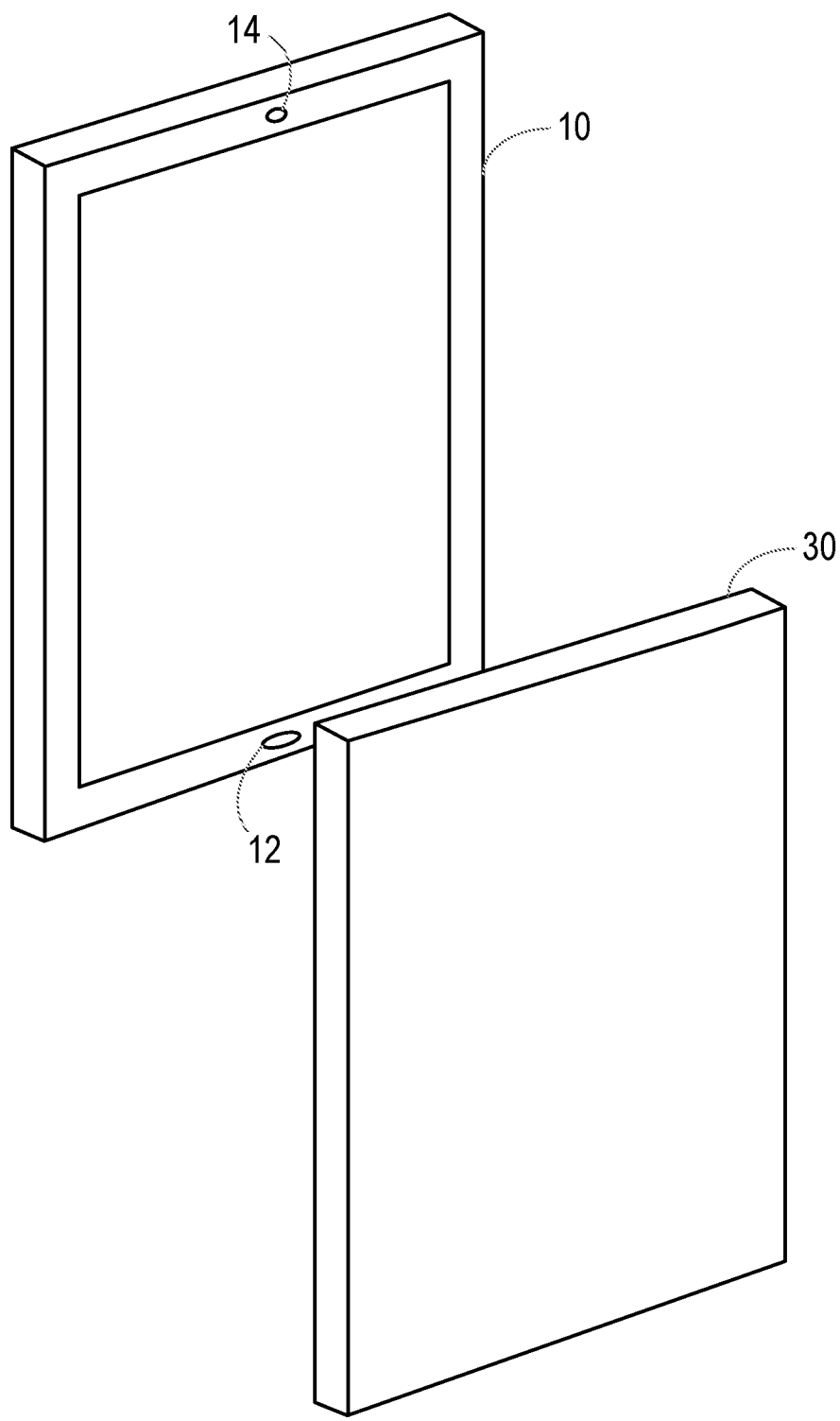
FIG. 3 illustrates a situation in which a replay attack is being performed.

FIG. 3 shows an example of a situation in which a replay attack is being performed. Thus, in FIG. 3, the smartphone 10 is provided with voice biometric functionality. In this example, the smartphone 10 is in the possession, at least temporarily, of an attacker, who has another smartphone 30. The smartphone 30 has been used to record the voice of the enrolled user of the smartphone 10. The smartphone 30 is brought close to the microphone inlet 12 of the smartphone 10, and the recording of the enrolled user's voice is played back. If the voice biometric system is unable to determine that the enrolled user's voice that it recognises is a recording, the attacker will gain access to one or more services that are intended to be accessible only by the enrolled user.

At the same time, or separately, when the smartphone 10 is provided with a camera-based biometric functionality, such as a facial recognition system, an attacker may use the display of the smartphone 30 to show a photo or video of the enrolled user, in an attempt to defeat the facial recognition system.

Embodiments described herein therefore attempt to perform liveness detection, for example detecting the presence of a person speaking any voice sounds that are detected.

Figure 4:
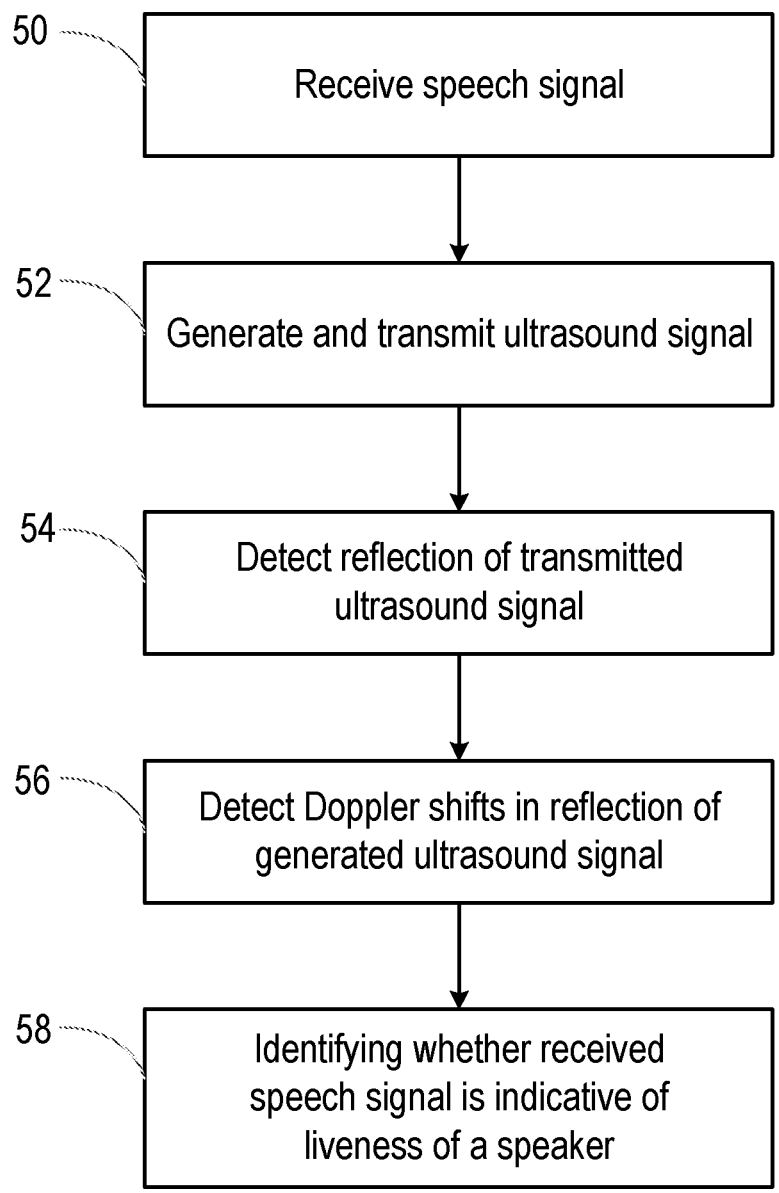
FIG. 4 is a flow chart illustrating a method of detecting liveness.
Figure 5:
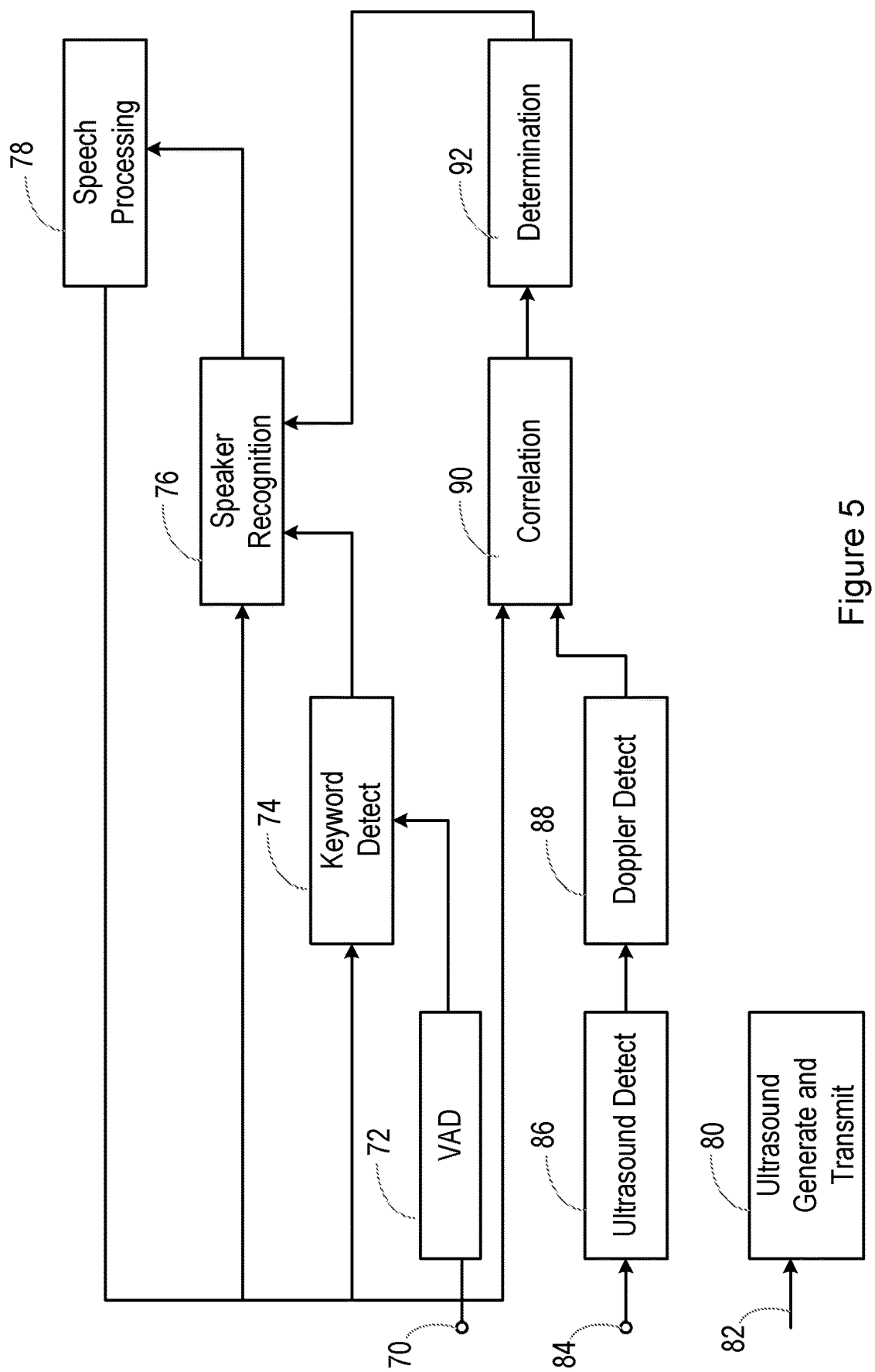
FIG. 5 illustrates a speech processing system, including a system for detecting liveness.

FIG. 4 is a flow chart, illustrating a method of liveness detection, for example for use in a biometrics system, and in this illustrated example used for detecting a replay attack on a voice biometrics system, and FIG. 5 is a block diagram illustrating functional blocks in one example of a speech processing system that includes the voice biometrics system.

Specifically, in step 50 in the method of FIG. 4, a signal is received on an input 70 of the system shown in FIG. 5. Thus, the input 70 may be connected to the microphone 12 shown in FIG. 1 or the multiple microphones 12, 12a, 12b, etc. shown in FIG. 2.

The received signal is passed to a voice activity detector (VAD) 72, which detects when the received signal contains speech.

The received signal is also passed to a keyword detection block 74. If it is determined by the voice activity detector 72 that the received signal contains speech, the keyword detection block 74 is activated, and it acts to detect the presence of a predetermined keyword in the detected speech. For example, the speech processing system of a smartphone might as a default operate in a low power mode, reflecting the fact that speech processing will be required for only a small fraction of the operating life of the device. The speech processing system may then be taken out of the low-power mode by the user uttering the predetermined keyword or phrase, such as "Hello phone".

The received signal is also passed to a speaker recognition block 76. If it is determined by the keyword detection block 74 that the predetermined keyword is present in the detected speech, the speaker recognition block 76 then attempts to determine whether the person who uttered the predetermined keyword is the registered user of the device and/or of a particular application on the device. Suitable biometric techniques are known for determining whether the speaker of the speech that is present in the received signal is the registered user.

If it is determined by the speaker recognition block 76 that the person who uttered the predetermined keyword is the registered user of the device and/or of the particular application on the device, then the received signal is passed to a speech processing block 78, which may be present on the device or may be located remotely, in the cloud. The speech processing block 78 then determines the content of the speech. If the speech contains a command, for example, then the speech processing block 78 generates a suitable signal for causing that command to be acted upon.

The system shown in FIG. 5 includes a mechanism for performing liveness detection, and hence for detecting whether the received signal containing speech has originated from a replay attack, as illustrated in FIG. 3.

Thus, in step 52 of the method shown in FIG. 4, an ultrasound signal is generated and transmitted, by the ultrasound generate and transmit block 80 shown in FIG. 5. The ultrasound transmit block 80 may operate at all times. In other embodiments, the ultrasound transmit block 80 operates only when it receives an enable signal on its input 82. The enable signal may be generated, for example, when the voice activity detector 72 determines that the received signal contains speech, or when the keyword detection block 74 detects the presence of the predetermined keyword, or when the speaker recognition block 76 starts to perform a biometric technique to determine whether the person who uttered the predetermined keyword is the registered user.

The ultrasound signal may be a single tone sine wave, or other configurations may be used, for example a chirp signal. The frequency of the ultrasound signal may be selected to be relatively close to 20 kHz for transmittability reasons, while being high enough to ensure that it is not audible.

In step 54 of the method shown in FIG. 4, a reflection of the generated ultrasound signal is detected.

In the system shown in FIG. 5, a signal is received on an input 84, and passed to an ultrasound detection block 86. For example, the input 84 may be connected to one or more of the multiple microphones 12, 12a, 12b, etc. shown in FIG. 2, to receive any signal detected thereby.

The received signal is passed to the ultrasound detection block 86, which may for example comprise one or more filter for selecting signals having a frequency that is close to the frequency of the ultrasound signal transmitted by the ultrasound transmit block 80. Reflected ultrasound signals may be Doppler shifted in their frequency, but the Doppler shifts are unlikely to be much more than 100 Hz, and so the ultrasound detection block 86 may comprise a filter for selecting signals having a frequency that is within 100 Hz of the frequency of the ultrasound signal transmitted by the ultrasound transmit block 80.

In step 56 of the method shown in FIG. 4, the received ultrasound signal detected by the ultrasound detection block 86 is passed to a Doppler detect block 88, to detect Doppler shifts in the reflection of the generated ultrasound signal. Thus, the received reflected ultrasound signal is compared with the generated ultrasound signal to identify frequency shifts in the reflected signal that are caused by reflections off a moving surface, such as the face, and in particular the lips, of a person who is speaking to generate the detected speech signal.

In step 58 of the method shown in FIG. 4, it is determined based on the detected Doppler shifts whether these Doppler shifts provide good evidence for the liveness of a person generating the detected speech.

In the illustrated embodiment shown in FIG. 5, the output of the Doppler detect block 88 is applied to one input of a correlation block 90. The received audio signal on the input 70 is applied to another input of the correlation block 90. In an alternative embodiment, a signal generated by the voice activity detect block 72 is applied to the other input of the correlation block 90. The output of the correlation block 90 is applied to a determination block 92 shown in FIG. 5.

If it is found by the correlation block 90 that there is a correlation between time periods in which Doppler shifts are detected in the reflection of the generated ultrasound signal, and time periods in which speech content is identified in the received speech signal, this indicates that the detected speech is generated by a live person moving their lips to generate the sound. If the degree of correlation is low, one possible reason for this may be that the detected speech is not generated by a live person moving their lips to generate the sound. One possible cause of this is that the detected speech is in fact generated by a replay attack.

Therefore, the determination block 92 produces an output signal that contains information about the liveness of the speaker, and hence about the likelihood that the detected speech was generated by a replay attack. This output signal is applied, in this illustrated embodiment, to the speaker recognition block 76, which is performing one or more voice biometrics process to determine whether the speaker is the registered user of the device. The speaker recognition block 76 can then use the output signal as one of several factors that it uses to determine whether the speaker is in fact the registered user of the device. For example, there may be one or more factors which indicate whether the detected speech is the speech of the registered user, and one or more factors which indicate whether the detected speech may have resulted from a replay attack.

In other examples, the liveness detection can be used for other purposes, for example for detecting an attempt to defeat a facial recognition system by presenting a still or moving image of an enrolled user.

As discussed in more detail below, the purpose of generating the ultrasound signal is to detect the movement of a speaker's face, and in particular the lips, while speaking. For this to operate successfully, it is advantageous that the ultrasound signal may be varied depending on information about the use of the device.

Thus, as described above, step 52 of the process shown in FIG. 4 involves generating and transmitting the ultrasound signal.

Figure 6:
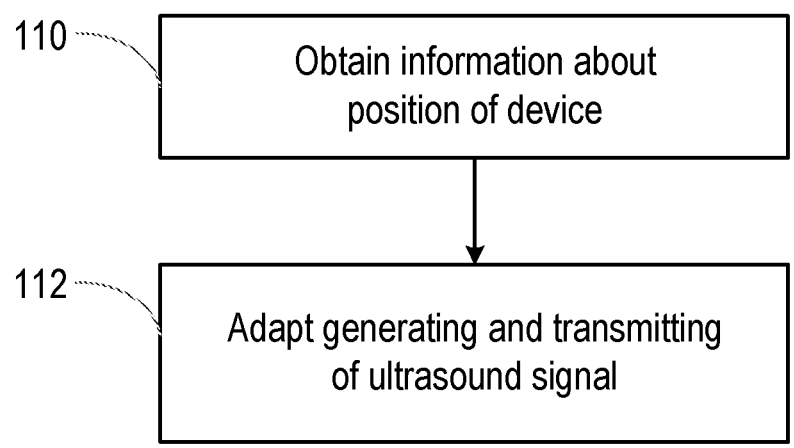
FIG. 6 is a flow chart illustrating a part of the method of detecting liveness.

FIG. 6 is a flow chart, giving more detail about this step, in some embodiments. Specifically, in step 110 of the method, the system obtains information about a position of the device 10.

For example, obtaining information about a position of the device may comprise obtaining information about an orientation of the device. Information about the orientation of the device may for example be obtained from gyroscopes and/or accelerometers provided as sensors 26 in the device 10.

As one alternative, obtaining information about a position of the device may comprise obtaining information about a distance of the device from the voice source. Information about a distance of the device from the voice source may for example be obtained by detecting the levels of signals generated by the microphones 12, 12a, 12b. For example, a higher signal level from one microphone may indicate that the voice source is closer to that microphone than to one or more other microphone.

As another alternative, obtaining information about a position of the device may comprise obtaining information about a position of the device relative to a supposed speaker. Information about the position of the device relative to a supposed speaker may for example be obtained from one or more proximity sensor provided as a sensor 26 in the device 10. Information about the position of the device relative to a supposed speaker may also be obtained from one or more light level sensor provided as a sensor 26 in the device 10. Information about the position of the device relative to a supposed speaker may also be obtained from one or more touch sensor provided as a sensor 26 in the device 10, indicating how the device 10 is being held by a user. Information about the position of the device relative to a supposed speaker may also be obtained from a camera provided as a sensor 26 in the device 10, which can track the position of a user's face relative to the device 10.

Then, in step 112, the method involves adapting the generating and transmitting of the ultrasound signal based on the information about the position of the device.

Adapting the generating and transmitting of the ultrasound signal may for example comprise adjusting a transmit power of the ultrasound signal. As another example, when the device has multiple transducers 14, 16, adapting the generating and transmitting of the ultrasound signal may comprise selecting the one or more transducer in which the ultrasound signal is generated, with the intention that the ultrasound signal should be generated from a transducer that is close to the user's mouth in order to be able to detect movement of the user's lips.

For example, obtaining information about a position of the device may comprise obtaining information about a distance of the device from the voice source, and adapting the generating and transmitting of the ultrasound signal may comprise adjusting a transmit power of the ultrasound signal, with a higher power being used when the device is further from the voice source, at least for distances below a certain limit. This allows the device to generate ultrasound signals that produce clearly detectable reflections, without risking transmitting ultrasound energy when the device is close to the user's ear.

As another example, obtaining information about a position of the device may comprise obtaining information as to which of multiple loudspeaker transducers is closest to the voice source (for example based on signal levels at microphones placed located close to those transducers), and adapting the generating and transmitting of the ultrasound signal may comprise transmitting the ultrasound signal mainly or entirely from that transducer. This allows the device to generate ultrasound signals from the transducer that is closest to the sound source, and thereby increase the chance of detecting usable reflection signals.

Other possibilities relate to specific ways in which speakers may use the device.

Thus, for example, when the device 10 is a mobile phone comprising at least a first transducer 16 at a lower end of the device and a second transducer 14 at an upper end of the device, adapting the generating and transmitting of the ultrasound signal based on the information about the position of the device may comprise transmitting the ultrasound signal at a relatively low power from the first transducer 16 if the information about the position of the device indicates that the device 10 is being used in a close talk mode. Close talk will be understood as a use of a phone where the phone is positioned adjacent the side of a user's face, and where communication is using the close-range earpiece speaker, e.g. as with a "traditional" phone handset positioning. For example, the ultrasound signal may be transmitted at a level of 70-90 dB SPL at 1 cm in this mode.

The information about the position of the device may be considered to indicate that the device is being used in a close talk mode if, for example, accelerometers indicate that the device 10 is in an upright position, and proximity sensors detect that the device 10 is being held close to a surface that might be a user's face 120, as shown in FIG. 7a.

More generally, adapting the generating and transmitting of the ultrasound signal based on the information about the position of the device may comprise transmitting the ultrasound signal from the second transducer if the information about the position of the device indicates that the device is being used in a generally vertical orientation.

As another example, when the device 10 is a mobile phone comprising at least a first transducer 16 at a lower end of the device and a second transducer 14 at an upper end of the device, adapting the generating and transmitting of the ultrasound signal based on the information about the position of the device may comprise transmitting the ultrasound signal at a relatively high power from the transducer 16 at the lower end of the device, if the information about the position of the device indicates that the device 10 may be being held by the user in front of their face 130, with the lower microphone 12 pointing towards them, i.e. in a "pizza slice" version of a near talk mode, as shown in FIG. 7b.

Near-talk mode will be understood as where a phone is positioned in front of the user's face, and where use may be made of near-field loudspeakers and microphones. This position may be suitable for the purposes of a video call, e.g. using software products such as Skype™ from Microsoft or FaceTime™ from Apple. "Pizza slice" mode will be understood as a variation of near-talk mode, but where the phone is held in a relatively horizontal position (such that a microphone positioned at the lower end of the phone faces the user directly).

For example, the ultrasound signal may be transmitted at a level of 90-110 dB SPL at 1 cm in this mode.

The information about the position of the device may be considered to indicate that the device is being used in a "pizza slice" mode if, for example, accelerometers indicate that the device is in a horizontal position, and the signal level detected by the microphone 12 is higher than the signal level detected by the microphones 12a, 12b.

More generally, adapting the generating and transmitting of the ultrasound signal based on the information about the position of the device may comprise transmitting the ultrasound signal from the first transducer if the information about the position of the device indicates that the device is being used in a generally horizontal orientation.

In the variant of the near talk mode, in which the device is held by the user in front of their face, for example so that they can see the screen on the device while speaking, adapting the generating and transmitting of the ultrasound signal based on the information about the position of the device may comprise transmitting the ultrasound signal at a relatively high power from the transducer 14 at the upper end of the device, or from transducers at both ends of the device.

As another example, adapting the generating and transmitting of the ultrasound signal based on the information about the position of the device may comprise preventing transmission of the ultrasound signal if the information about the position of the device indicates that the device is being used in a far field mode, for example with the device 10 being placed on a surface 140 some distance from the user 142, as shown in FIG. 7c. In this example, the information about the position of the device may indicate that the device is located more than a threshold distance (for example 50 cm) from the source of the sound.

This is because it may be determined that detecting the movement of a speaker's lips is only reliable enough for use when the indications are that the device may be being held close to the user's face.

As shown in FIG. 5, and as described above, the output of the Doppler detect block 88 is applied to one input of a correlation block 90. The received audio signal on the input 70 is applied to another input of the correlation block 90. The correlation block 90 determines whether there is a correlation between time periods in which Doppler shifts are detected in the reflection of the generated ultrasound signal, and periods in which there is speech.

The aim is to confirm that any Doppler shifts that are detected in the received reflection of the generated ultrasound signal do result from facial movements of a speaker, and are not the result of spurious reflections from other moving objects.

Figure 8:
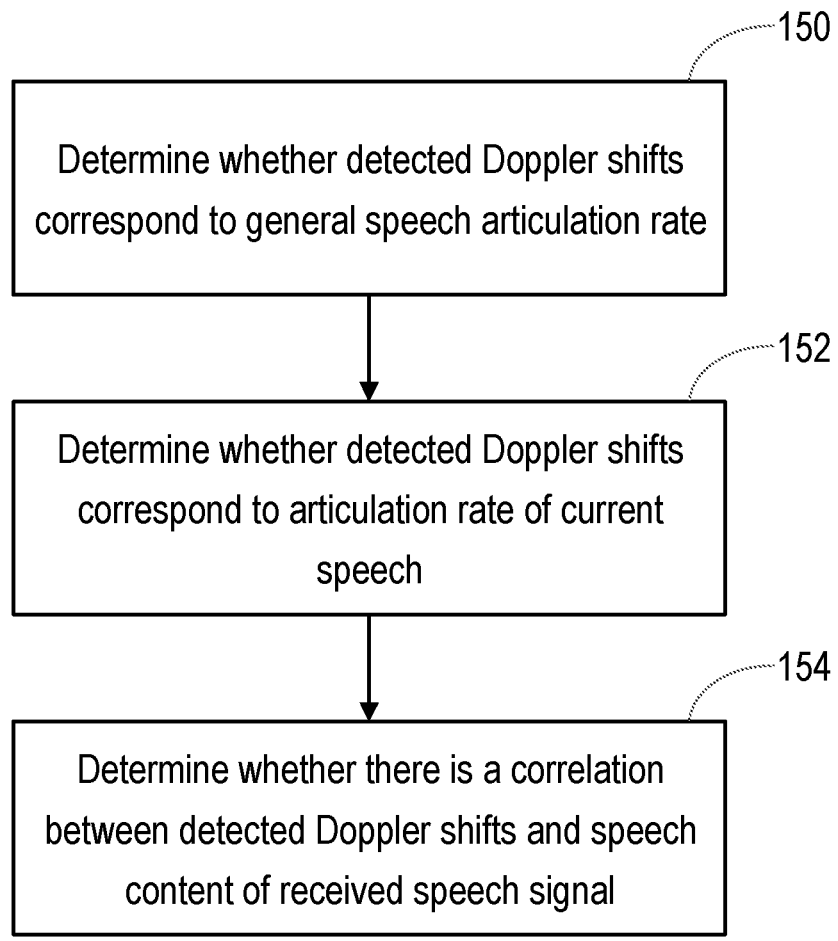
FIG. 8 is a flow chart illustrating a part of the method of detecting liveness.

FIG. 8 is a flow chart, illustrating a method performed in the correlation block 90.

First, it is determined in step 150, whether the detected Doppler shifts correspond to a general speech articulation rate. The articulation rate is the rate at which syllables are produced during speech, and it has been found that, for most speech, a typical articulation rate is in the range of 4-10 Hz. The facial movements of the speaker (for example movements of the speaker's lips, cheeks, and nostrils) will typically occur at the same rate. Thus, in step 150, it is determined whether the detected Doppler shifts correspond to facial movements at a frequency in the range of 4-10 Hz.

In step 152, it is determined whether the detected Doppler shifts correspond to an articulation rate of the current speech.

Thus, the articulation rate of the speech contained in the received audio signal is extracted in the correlation block 90. It is then determined whether the detected Doppler shifts correspond to facial movements at a frequency that corresponds to that extracted articulation rate.

If it is determined that the detected Doppler shifts correspond to facial movements at a frequency that corresponds to that extracted articulation rate, this can be taken as good evidence of liveness.

In a further possible step, in step 154 of the method shown in FIG. 8, it is determined whether there is a correlation between detected Doppler shifts in the reflection of the generated ultrasound signal, and speech content of the received speech signal.

It is recognised that one issue with using ultrasound as described herein, is that there may be interfering sources of ambient ultrasound noise.

Figure 9:
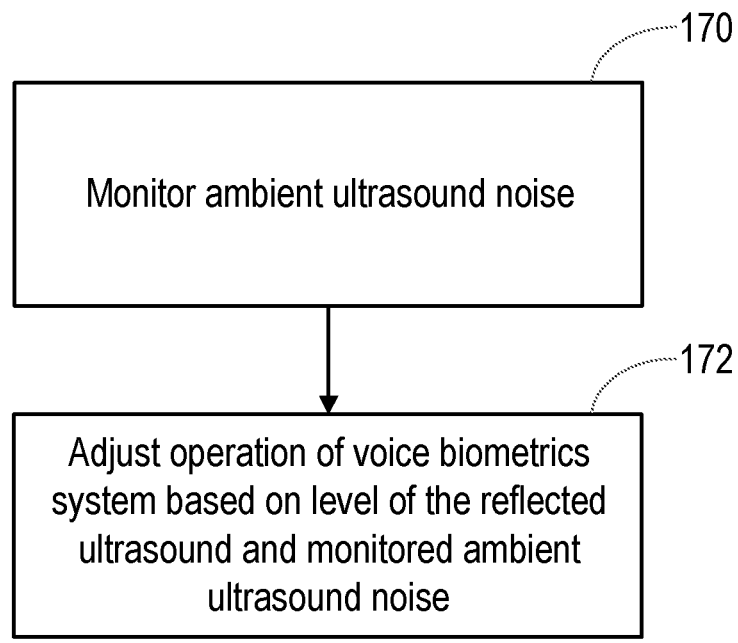
FIG. 9 is a flow chart illustrating a part of the method of detecting liveness.

Therefore, FIG. 9 is a flow chart, illustrating one method performed in the Doppler detect block 88 and correlation block 90.

Specifically, in step 170, a level of ambient ultrasound noise is monitored. Then, in step 172, the operation of the voice biometrics system is adjusted based on the levels of the reflected ultrasound and monitored ambient ultrasound noise.

Figure 10:
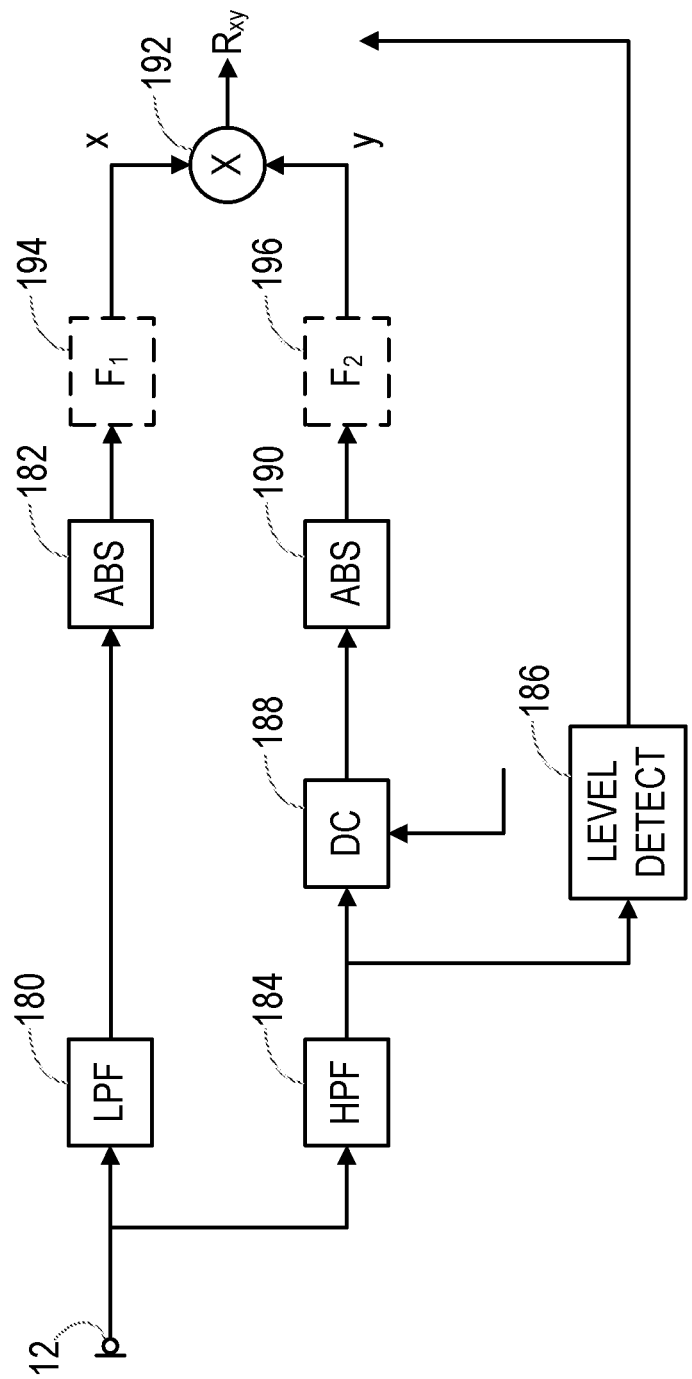
FIG. 10 is a block diagram, illustrating a part of the system for detecting liveness.
Figure 11:
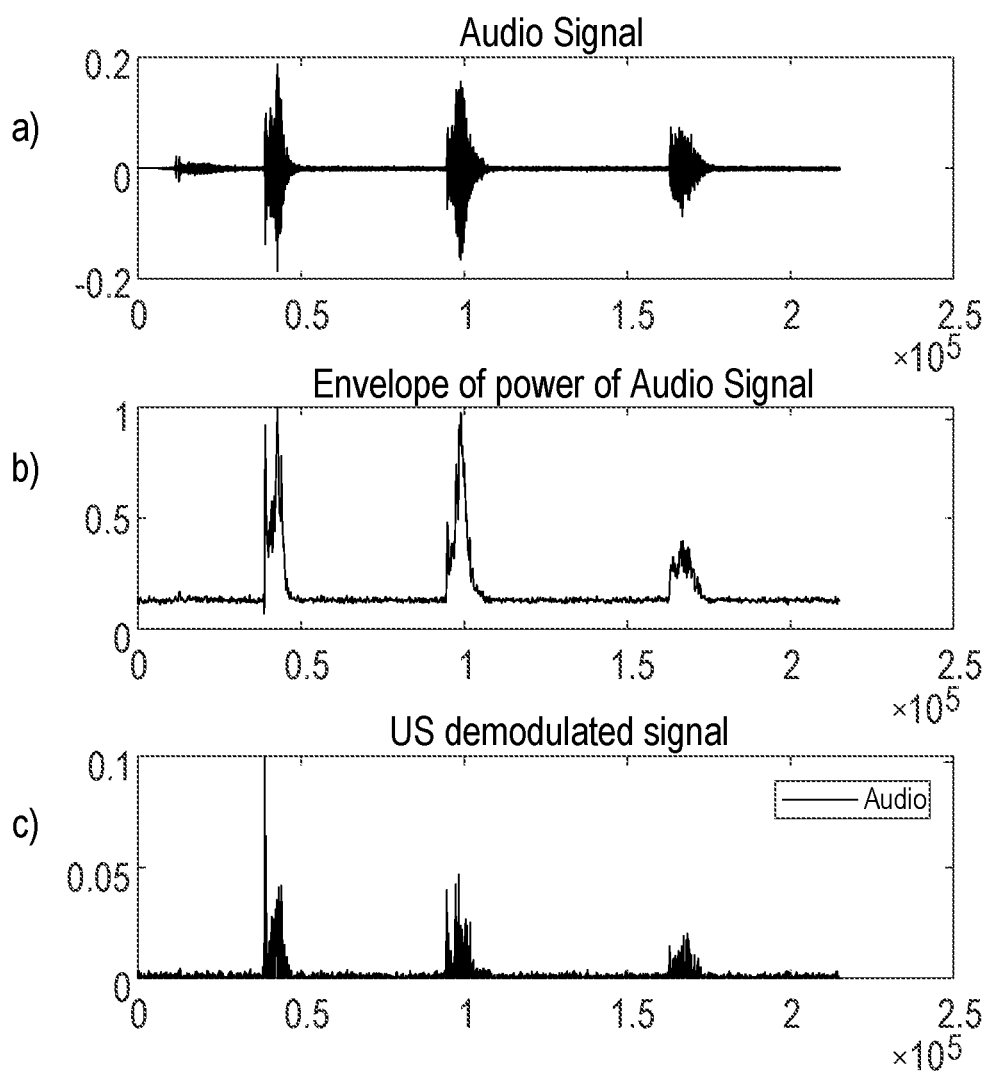
FIG. 11 illustrates results of the method of detecting liveness.

FIG. 10 is a block diagram, illustrating schematically the operation of the Doppler detect block 88 and correlation block 90. FIG. 11 illustrates signals obtained at different stages of the operation.

Specifically, the signal from one or microphone 12 is passed to a low pass filter 180, for isolating the audio frequency components (for example, below 20 kHz) of the detected signal. The resulting audio signal, in one example, is shown in FIG. 11(a).

The signal level of the audio signal is found in a block 182 that finds the absolute value of the signal. The resulting envelope signal, in the same example, is shown in FIG. 11(b).

The signal from the one or microphone 12 is also passed to a high pass filter 184, for isolating the ultrasound components (for example, above 20 kHz) of the detected signal. This may contain the wanted reflection of the generated ultrasound signal, but may also contain interfering ambient ultrasound noise.

The level of the ultrasound signal is determined by a level detector 186.

The ultrasound signal is then passed to a demodulation block 188, where it is downconverted to the audio band, and any Doppler shifted reflections are found. This is achieved by mixing the received ultrasound signal with the ultrasound signal that was generated and transmitted. The received ultrasound signal can be passed through a band pass filter before downconversion if required, in order to remove other ultrasound signals not originating from the transmitted signal. In addition, the output of the mixing step can be low-pass filtered.

The resulting signal, in one example, is shown in FIG. 11(c).

The signal level of the Doppler shifted reflected signal is found in a block 190 that finds the absolute value of the signal.

It can thus be seen from FIG. 11 that there is a correlation between the detected Doppler shifts in the reflection of the generated ultrasound signal, and speech content of the received speech signal.

In order to obtain a robust result, a correlation operation is performed, as shown at block 192 of FIG. 10.

However, before performing the correlation, it is noted that, while the audio signal is effectively the result of the facial movements of the speaker, the Doppler shifts in the reflected ultrasound signal will result from the velocity of the facial movements.

Therefore, in some embodiments, either the audio signal is differentiated (for example by passing through a block 194 in the form of a band pass filter with a pass-band of, say, 10-200 Hz, an envelope block, or a differentiator), or the ultrasound signal is integrated (for example by passing through a block 196 in the form of a leaky integrator or a band pass filter with a pass-band of, say, 10-200 Hz).

The correlator 192 then performs a frame-by-frame cross correlation on the signals. If the correlation result Rxy is above a threshold then it is determined that there is enough of a correlation, between the detected Doppler shifts and the speech content of the received speech signal, to conclude that there is evidence of a live speaker, and hence that the speech may not result from a replay attack. If there is not good evidence of liveness of a speaker, this may be an indication that the received speech signal may be a product of a replay attack.

The operation of the system may be adjusted, based on a level of the reflected ultrasound and the monitored ambient ultrasound noise, as detected by the level detector 186.

For example, the reliance that is placed on the determination as to whether the received speech signal may be the result of a replay attack may be adjusted, based on the level of the monitored ambient ultrasound noise. The determination, as to whether the received speech signal may be the result of a replay attack, will typically be made based on more than one factor. It is recognised that the presence of large ambient ultrasound signals will impact on the reliability of this system, and so the reliance that is placed on the determination may be reduced, as the level of the monitored ambient ultrasound noise increases. More specifically, if the level of the monitored ambient ultrasound noise exceeds a first threshold level, the result of the correlation may be ignored completely, or the correlation may not be performed.

For lower levels of interference, the adjustment of the operation of the system may involve adapting the threshold correlation value that is used in determining whether there is enough of a correlation, between the detected Doppler shifts and the speech content of the received speech signal, to conclude that there is evidence of a live speaker. Specifically, for low levels of ultrasound interference, a high threshold correlation value can be used. For somewhat higher levels of ultrasound interference (still below the first threshold mentioned above), lower threshold correlation values can be used, to take account of the fact that the presence of interference will automatically reduce the correlation values obtained from the correlator 192.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of liveness detection in a device, the method comprising:
   receiving a speech signal from a voice source;
   generating and transmitting an ultrasound signal through a transducer of the device;
   detecting a reflection of the transmitted ultrasound signal;
   detecting Doppler shifts in the reflection of the generated ultrasound signal; and
   identifying whether the received speech signal is indicative of liveness of a speaker based on the detected Doppler shifts,
   and the method further comprising:
   obtaining information about a position of the device relative to the voice source; and
   adjusting the transmit power of the ultrasound signal based on the information about the position of the device relative to the voice source;
   wherein adjusting the transmit power comprises increasing the transmit power when the device is moved further away from the voice source.

2. A method according to claim 1, wherein the device has multiple transducers, and wherein adapting the generating and transmitting of the ultrasound signal comprises:
   selecting the transducer in which the ultrasound signal is generated.

3. A method according to claim 1, wherein obtaining information about a position of the device comprises obtaining information about an orientation of the device.

4. A method according to claim 1, wherein the device is a mobile phone comprising at least a first transducer at a lower end of the device and a second transducer at an upper end of the device, and wherein adapting the generating and transmitting of the ultrasound signal based on the information about the position of the device comprises:
   transmitting the ultrasound signal at an intensity in the range of 90-110 dB SPL at 1 cm if the information about the position of the device indicates that the device is being used in a near talk mode.

5. A method according to claim 4, wherein adapting the generating and transmitting of the ultrasound signal based on the information about the position of the device comprises:
   transmitting the ultrasound signal from the first transducer if the information about the position of the device indicates that the device is being used in a generally horizontal orientation.

6. A method according to claim 4, wherein adapting the generating and transmitting of the ultrasound signal based on the information about the position of the device comprises:
   transmitting the ultrasound signal from the second transducer if the information about the position of the device indicates that the device is being used in a generally vertical orientation.

7. A method according to claim 1, wherein adapting the generating and transmitting of the ultrasound signal based on the information about the position of the device comprises:

preventing transmission of the ultrasound signal if the information about the position of the device indicates that the device is being used in a far field mode.

8. A method according to claim 1, wherein adapting the generating and transmitting of the ultrasound signal comprises adjusting a transmit power of the ultrasound signal, with a higher power being used when the device is further from the voice source, for distances below a predetermined maximum distance.

9. A method according to claim 1, wherein obtaining information about a position of the device comprises obtaining information as to which of multiple loudspeaker transducers is closest to the voice source, and adapting the generating and transmitting of the ultrasound signal comprises transmitting the ultrasound signal primarily or entirely from that loudspeaker.

10. A method according to claim 1, comprising obtaining information about the position of the device from one or more of the following:

gyroscopes, accelerometers, proximity sensors, light level sensors, touch sensors, sound level sensors, and a camera.

11. A method according to claim 1, for use in a voice biometrics system, wherein identifying whether the received speech signal is indicative of liveness comprises determining whether the received speech signal may be a product of a replay attack.

12. A system for liveness detection in a device, the system comprising:

at least one microphone input, for receiving an audio signal from a microphone; and at least one transducer output, for transmitting a signal to an ultrasound, and the system being configured for:

receiving a speech signal from the at least one microphone input;

generating a control signal through the transducer output, for transmitting an ultrasound signal through a transducer of the device;

detecting a reflection of the transmitted ultrasound signal;

detecting Doppler shifts in the reflection of the generated ultrasound signal; and identifying whether the received speech signal is indicative of liveness of a speaker based on the detected Doppler shifts, and the method further comprising:

obtaining information about a position of the device relative to the voice source; and adjusting the transmit power of the ultrasound signal based on the information about the position of the device relative to the voice source;

wherein adjusting the transmit power comprises increasing the transmit power when the device is moved further away from the voice source.

13. A non-transitory computer readable storage medium having computer-executable instructions stored thereon that, when executed by processor circuitry, cause the processor circuitry to perform a method according to claim 1.

* * * * *

UNITED STATES PATENT AND TRADEMARK OFFICE
CERTIFICATE OF CORRECTION

PATENT NO. : 11,705,135 B2
APPLICATION NO. : 17/060339
DATED : July 18, 2023
INVENTOR(S) : John Paul Lesso It is certified that error appears in the above-identified patent and that said Letters Patent is hereby corrected as shown below:

In the Claims

1. In Column 13, Line 10, in Claim 8, delete "a transmit" and insert -- the transmit --, therefor.

2. In Column 14, Line 20, in Claim 12, delete "the voice" and insert -- a voice --, therefor.

Signed and Sealed this
Thirty-first Day of October, 2023

Katherine Kelly Vidal
*Director of the United States Patent and Trademark Office*